(12) United States Patent
Hayashi et al.

(10) Patent No.: US 6,698,457 B2
(45) Date of Patent: Mar. 2, 2004

(54) FLEXIBLE HOSE, MANUFACTURING METHOD THEREOF AND EXTRUDER

(75) Inventors: Tokujiro Hayashi, Kobe (JP); Noriaki Fujimoto, Kobe (JP)

(73) Assignee: Tigers Polymer Corporation, Toyonaka (JP)

( * ) Notice: Subject to any disclaimer, the term of this patent is extended or adjusted under 35 U.S.C. 154(b) by 64 days.

(21) Appl. No.: 09/866,650

(22) Filed: May 30, 2001

(65) Prior Publication Data

US 2002/0003003 A1 Jan. 10, 2002

Related U.S. Application Data

(63) Continuation-in-part of application No. 09/458,702, filed on Dec. 13, 1999, now abandoned.

(30) Foreign Application Priority Data

| Jan. 11, 1999 | (JP) | ................................................. 11-4080 |
| Feb. 15, 1999 | (JP) | ............................................... 11-35849 |
| Mar. 1, 1999 | (JP) | ............................................... 11-52477 |
| Aug. 19, 1999 | (JP) | ............................................ 11-232217 |

(51) Int. Cl.$^7$ ................................................. F16L 11/00
(52) U.S. Cl. ........................ 138/127; 138/129; 138/133; 138/144; 138/122; 264/210.2; 264/280
(58) Field of Search ................................. 138/125, 126, 138/127, 129, 133, 144, 104, 122; 264/210.2, 280

(56) References Cited

U.S. PATENT DOCUMENTS

| 2,661,025 | A | | 12/1953 | Brace |
| 2,688,343 | A | | 9/1954 | Cuddeback |
| 3,989,785 | A | | 11/1976 | Bridge |
| 4,098,298 | A | | 7/1978 | Vohrer |
| 4,233,097 | A | | 11/1980 | Stahl |
| 4,304,266 | A | * | 12/1981 | Kutnyak et al. ............. 138/129 |
| 4,310,946 | A | | 1/1982 | Baker et al. |
| 4,354,051 | A | | 10/1982 | Kutnyak |
| 4,490,575 | A | | 12/1984 | Kutnyak |
| 4,693,324 | A | * | 9/1987 | Choiniere et al. ........... 138/122 |
| 5,555,915 | A | | 9/1996 | Kanao |
| 5,806,567 | A | | 9/1998 | Kukui et al. |
| 5,996,641 | A | * | 12/1999 | Chen ........................... 138/122 |
| 6,000,435 | A | * | 12/1999 | Patel et al. .................. 138/122 |
| 6,024,134 | A | | 2/2000 | Akedo et al. |
| 6,186,183 | B1 | | 2/2001 | Lepoutre |
| 6,305,428 | B1 | * | 10/2001 | Nakamura et al. ........... 138/126 |

* cited by examiner

*Primary Examiner*—James Hook
(74) *Attorney, Agent, or Firm*—Burns, Doane, Swecker & Mathis, LLP

(57) ABSTRACT

A flexible hose which has a hose body made of soft synthetic resin, a reinforcement made of hard synthetic resin wound spirally and joined to the hose body by fusion, and a conductor arranged inside the reinforcement in its longitudinal direction. The conductor does not adhere to the reinforcement and is movable. The hose body is formed by: extruding a tube made of soft resin from a head of an extruder; pressing and flattening the tube to form a strip; and winding the strip spirally with the adjacent side edges joined together.

17 Claims, 8 Drawing Sheets

FLEXIBLE HOSE, MANUFACTURING METHOD THEREOF AND EXTRUDER

This is a continuation-in-part application of the pending U.S. application Ser. No. 09/458,702 filed on Dec. 13, 1999 now abandoned.

BACKGROUND OF THE INVENTION

1. Field of the Invention

The present invention relates to flexible hoses, a manufacturing method thereof and an extruder, and more particularly to flexible hoses which are suited to be used as suction hoses of electric vacuum cleaners, a manufacturing method thereof and an extruder.

2. Description of Related Art

Conventionally, as a suction hose of an electric vacuum cleaner, a hose is known by Japanese Patent Publication No. 1-21973 wherein a hose body is formed by spirally winding a strip made of synthetic resin and a conductor is contained in a cavity formed in the strip.

However, in the above hose, the cavity to contain the conductor is formed by folding an edge of the strip, and the manufacturing process is complicated. Also, the cavity is not large enough to provide a space for the conductor contained in the cavity to move freely, i.e. when the hose is bent, the conductor can not move in a diametrical direction to the hose and may break under stress. To withstand the stress, the conductor has to reach a specified thickness, and it causes a problem of raise in cost for the hose.

On the other hand, conventional flexible hoses are manufactured in such a way that: a strip of a specified width and thickness made of soft resin in a melted state is extruded from a die of an extruder; and the strip is spirally wound around rotating shafts for forming a hose with the strip overlapping previously wound portion; thus the strip forms a hose body; at the same time, a wire made of hard resin in a melted state is joined to the hose body by fusion as a spiral reinforcement.

What is used as a strip made of soft resin to form the above hose body is a resin tape which is extruded from a die of a straight head of an extruder. On this condition, there is a case that modifying width or thickness of the resin tape is needed according to usage or desired properties of the hose. In such a case, for example, in order to thin the resin tape without changing its width, decreasing the extruding volume of the resin or speeding up in pulling out the resin tape while using the same die was tried. However, the object was not achieved because the width of the resin tape also narrowed.

It means that the shape of the opening for discharging resin of one selected die almost determines the width and the thickness of the resin tape, i.e. it is impossible to form another resin tape of different width or thickness without changing dies. Accordingly, each time to modify the width or the thickness of the resin tape, the operations of: changing dies for the appropriate size; extruding a resin tape; and forming a hose; are necessary. Such operations require equipment of various shapes of dies, and the operation of changing dies is complicated and costs much time. Thus, there is a problem of inefficiency.

SUMMARY OF THE INVENTION

Therefore, an object of the present invention is to provide a flexible hose wherein a conductor, which is a component of an electronic circuit of a remote switch or for driving a power brush etc., is relatively free to move.

Another object of the present invention is to provide a flexible hose wherein the conductor will not break even if an inexpensive thin wire is used for the conductor.

Further, another object of the present invention is to provide a flexible hose which does not use polyvinyl chloride resin (PVC), the use of which tends to be restricted under the recent global environmental problems because it is deemed that burning waste PVC generates noxious gas.

Another object of the present invention is to provide a flexible hose and a manufacturing method thereof wherein width and thickness of a strip can be adjusted freely with one die of an extruder without changing to another die.

Further, another object of the present invention is to provide an extruder which is capable of inserting a conductor easily in a reinforcement of hard synthetic resin which is to be spirally wound and joined onto an outer surface of a hose body of soft synthetic resin.

In order to achieve the above objects, a flexible hose according to the present invention comprises a hose body made of soft synthetic resin, a reinforcement made of hard synthetic resin which is spirally wound and joined to the hose body by fusion, and a conductor arranged inside the reinforcement in its longitudinal direction, the conductor being inserted in a space made in the reinforcement when the reinforcement is formed by extrusion molding of the hard synthetic resin so as not to adhere to the reinforcement and so as to be movable.

In the flexible hose according to the present invention, because the conductor is relatively movable, straining or compressive force does not act on the conductor, and the possibility of breakage of the conductor is small. Therefore, a thin conductive wire can be used with no problem, and the cost for the hose can be lowered.

Further, the flexible hose containing the conductor inside uses only soft and hard synthetic resin, does not require any complicated manufacturing apparatus or processes, it is easily manufactured by a general purpose extruder, and further meets the requirement for quitting the use of PVC.

Also, the flexible hose according to the present invention comprises two reinforcing members wound around a hose body in parallel to each other, and the conductor is arranged in each of the reinforcing members. The conductors correspond to an anode and a cathode respectively, and means for distinguishing the polarity of the conductors is provided. The means for distinguishing the polarity is a difference in color, and for example, the means is achieved by plating at least one of the uncovered conductors.

Further, the flexible hose according to the present invention is manufactured by the following processes of: extruding a tube made of soft resin from a head of an extruder; then pressing and flattening the tube to form a strip; and winding the strip spirally with its adjacent side edges joined together to form a hose body. It is preferable that a reinforcement made of hard resin is further wound spirally and joined to the hose body by fusion.

In the manufacturing method according to the present invention, as the strip to form a hose body, a cylindrical tube extruded from a cross head of an extruder is used. The cylindrical tube is pressed and flattened while in a melted state right after the extrusion. This strip formed of the flattened tube is spirally wound, and the adjacent side edges of the spirally wound strip are joined together simultaneously with fusion joining of a spiral reinforcement made of hard resin in a melted state onto the adjacent side edges. In this method, it is possible to adjust the width and the thickness of the strip freely without changing dies in manufacturing the flexible hose.

If an extruder with a cross head die is used, it is possible to blow air into a tube which is being extruded continuously, and thus, an enlargement of the tube in diameter is possible. The enlarged tube will be formed into a wider strip when it is flattened. Thus, it is possible to adjust the width of the strip freely by properly enlarging the tube in diameter. Also, it is possible to adjust the thickness of the strip freely by properly adjusting the thickness or the biased thickness of the tube.

An extruder for extrusion molding hard synthetic resin into a reinforcement, which is to help a hose body made of soft synthetic resin keep its shape, while inserting a conductor in the reinforcement to be movable in the reinforcement, said extruder comprising: a passage through which the hard synthetic resin for the reinforcement is extruded; and a thin tube-like guide through which a conductor is to be inserted longitudinally in the reinforcement extruded from the passage, a tip of the guide slightly sticking out of an exit of the passage or being on a level with the exit of the passage.

In the extruder according to the present invention, since the tip of the guide to guide the conductor in the reinforcement slightly sticks out of an exit of the passage or is substantially on a level with the exit of the passage, it is possible to insert the conductor in the reinforcement longitudinally so that the conductor is movable therein.

At the exit of the passage, a higher pressure is applied to the hard synthetic resin which is being extruded through the passage because the passage becomes narrower around the exit. If the tip of the guide is in the passage, the hard synthetic resin which is being extruded through the passage will flow backward into the tube-like guide, and the hard synthetic resin will adhere to the conductor. Then, in this case, the conductor cannot be inserted in the reinforcement to be movable therein.

BRIEF DESCRIPTION OF THE DRAWINGS

These and other objects and features of the present invention will be apparent from the following description with reference to the accompanying drawings, in which.

DETAILED DESCRIPTION OF THE PREFERRED EMBODIMENTS

Preferred embodiments of the present invention are hereinafter described with reference to the accompanying drawings.

Figure 1:
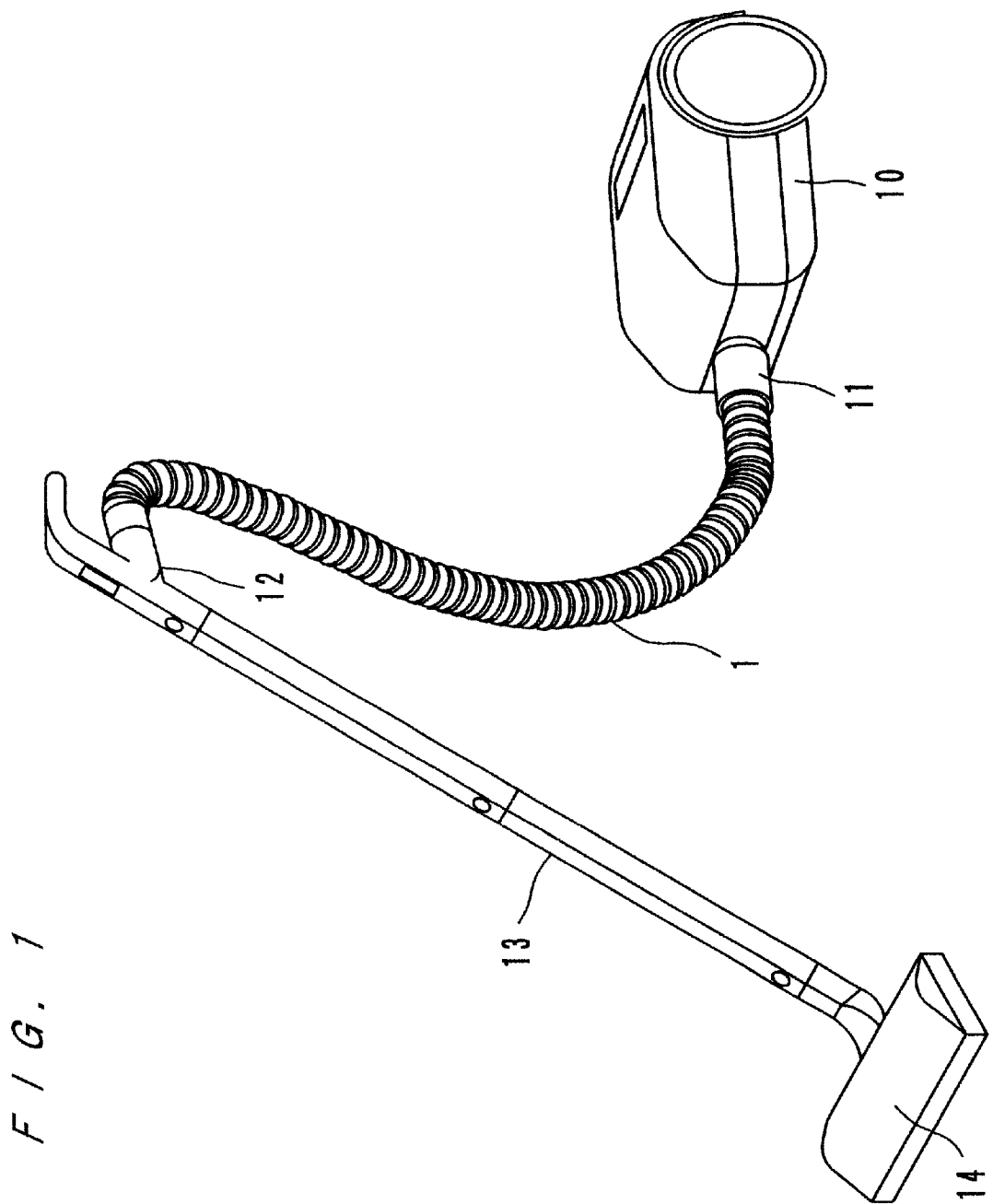
FIG. 1 is a perspective view of an electric vacuum cleaner provided with a flexible hose of the first embodiment of the present invention.
Figure 2:
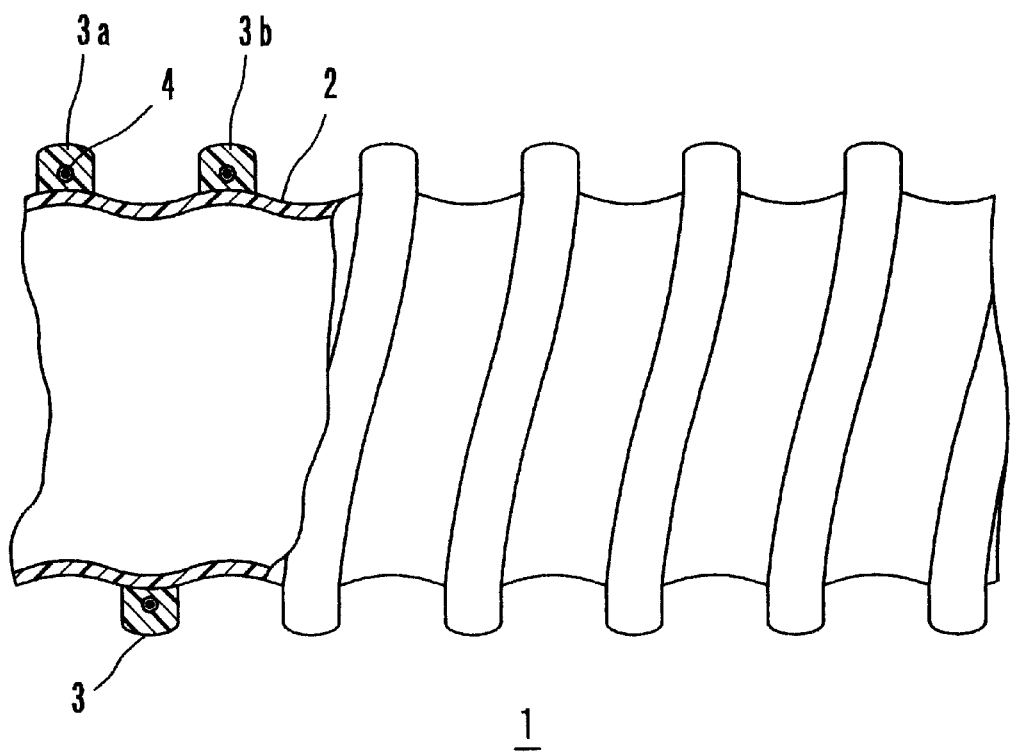
FIG. 2 is a partially cutaway front view of the flexible hose.
Figure 3:
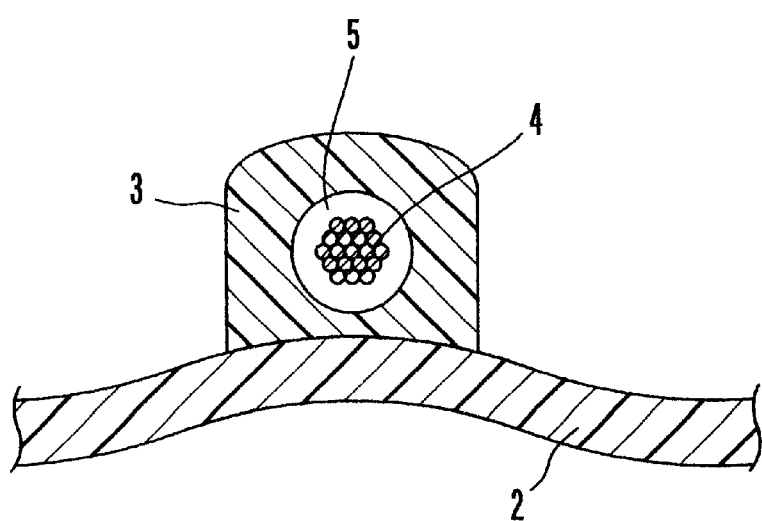
FIG. 3 is a partially enlarged cross section of the flexible hose.

FIG. 1 shows the appearance of an electronic vacuum cleaner, FIG. 2 shows a flexible hose of the first embodiment of the present invention as partially cut open, and FIG. 3 shows a part of the hose as enlarged.

A flexible hose 1 of the first embodiment comprises a hose body 2 made of soft synthetic resin and two spiral reinforcing members 3a and 3b made of hard synthetic resin joined to an outer surface of the hose body 2 by fusion in a double pitch. The hose 1 is connected by an end with an inlet provided in a main body 10 of a vacuum cleaner via a connecting pipe 11, and the other end is connected with a handle 12. The handle 12 is continuously connected with an extension pipe 13, and the extension pipe 13 is connected with a floor nozzle 14.

The hose body 2 is formed by: winding a strip of an extruded fusing tape made of thermoplastic elastomer (TPE) except PVC, for example, olefin TPE, styrene TPE, urethane TPE, hydrogen added styrene butadiene rubber (HSBR), etc., or compounds of these materials; and joining the adjacent side edges of the strip together by fusion.

The spiral reinforcement 3 is made of hard synthetic resin which is compatible and fusible with the material of the hose body 2, i.e. TPE, etc. The hard synthetic resin is polyolefin resin, for example, polypropylane (PP), polyethylene (PE) and so forth. The spiral reinforcement 3 is formed by extrusion molding of the hard synthetic resin, and the extruded resin is wound and joined to the outer surface of the hose body 2 by fusion. It is preferable to select as the hard synthetic resin for the spiral reinforcement 3 the one of high hardness, for example, the one whose bending elasticity is larger than 10,000 k gf/cm$^2$ (by tension test of JIS K6758).

A space 5 is formed inside the spiral reinforcement 3 in its longitudinal direction, wherein a conductor 4 made of an uncovered stranded copper wire (for example, a strand of 10 wires of 0.12 mm in diameter) is inserted, and the conductor 4 does not stick to the reinforcement 3 so that the conductor 4 can move freely. The conductor 4 is previously inserted in a center portion of an extruding head, and while the hard synthetic resin for the reinforcement 3 is being extruded, the conductor 4 is disposed in the reinforcement 3 without adhering to the reinforcement 3 and to be movable therein.

Figure 4:
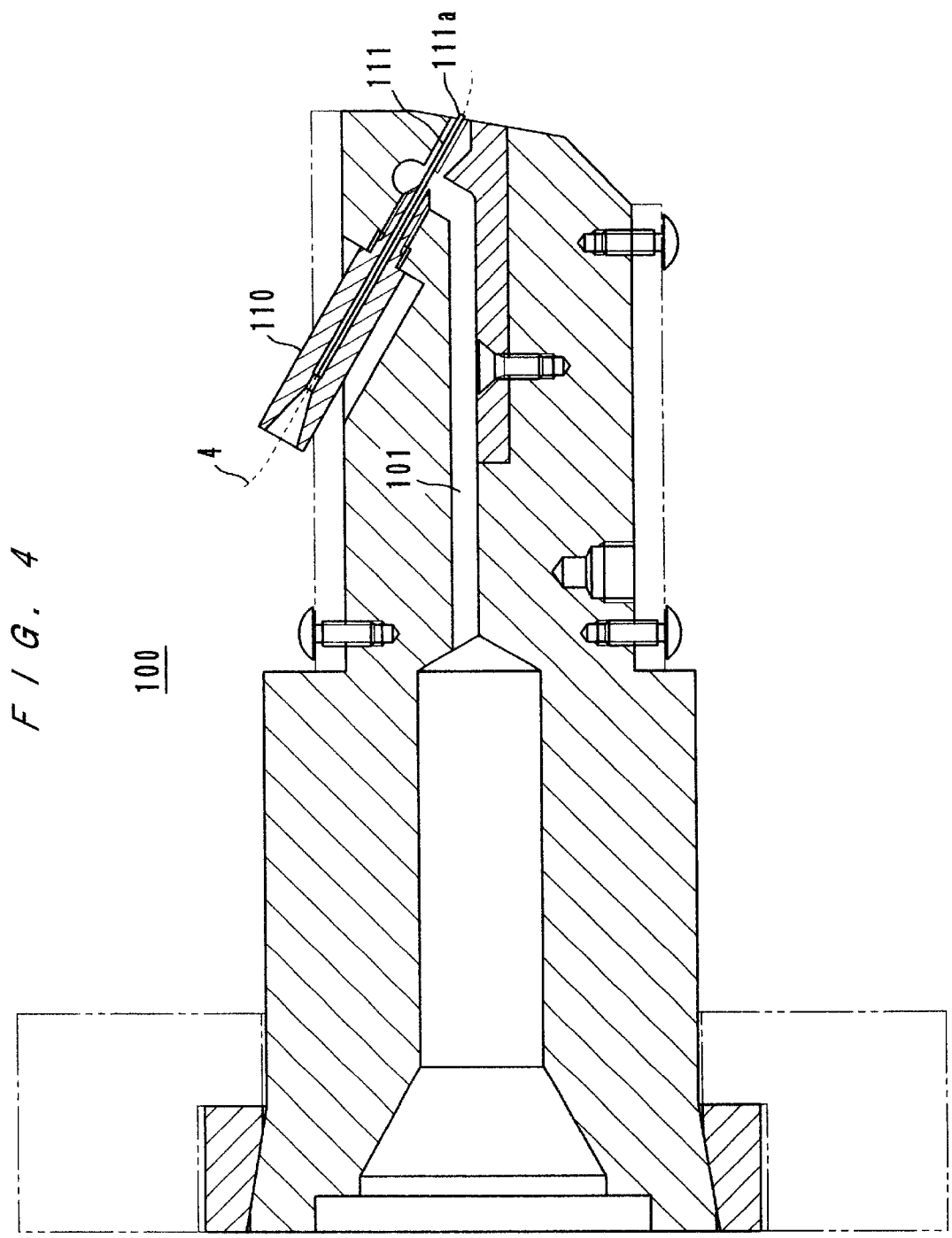
FIG. 4 is a cross section which shows an extruder for manufacturing reinforcements.

FIG. 4 shows a head 100 of an extruder for manufacturing the reinforcement 3 with the conductor 4 movably inserted therein. The head 100 comprises a passage 101 through which the hard resin for the reinforcement 3 is extruded, and a guide holder 110 arranged in the exit side of the passage 101. Through the center of the guide holder 110, a thin tube-like guide 111 is inserted to guide the conductor 4. A tip 111a of the guide 111 slightly sticks out of an exit of the passage 101. Thereby, the conductor 4 is movably inserted into the space 5 in the reinforcement 3. Even if the tip 111a of the guide 111 is substantially on a level with the exit of the passage 101, the conductor 4 can be movably inserted in the space 5 without sticking to the reinforcement 3.

It is also possible in the flexible hose 1 that the reinforcement 3 is joined to an inner surface of the hose body 2. Further, the reinforcement 3 may be composed of a single wire or composed of three or more wires. Also, the conductor 4 may be insulated or a single wire while an uncovered stranded copper wire is preferable.

Now, distinguishing polarity of the conductor 4 is described. As mentioned above, two reinforcing members are wound in a double pitch as the reinforcement 3, and the conductor 4 arranged in the respective reinforcing members correspond to an anode and a cathode respectively. According to this structure, one of the conductor is colored silver by tin plating, and the other is left uncovered without plating. In this way, polarity of the conductor is easily distinguished by sight.

Next, a flexible hose 21 of the second embodiment of the present invention and a manufacturing method thereof are described.

Figure 5:
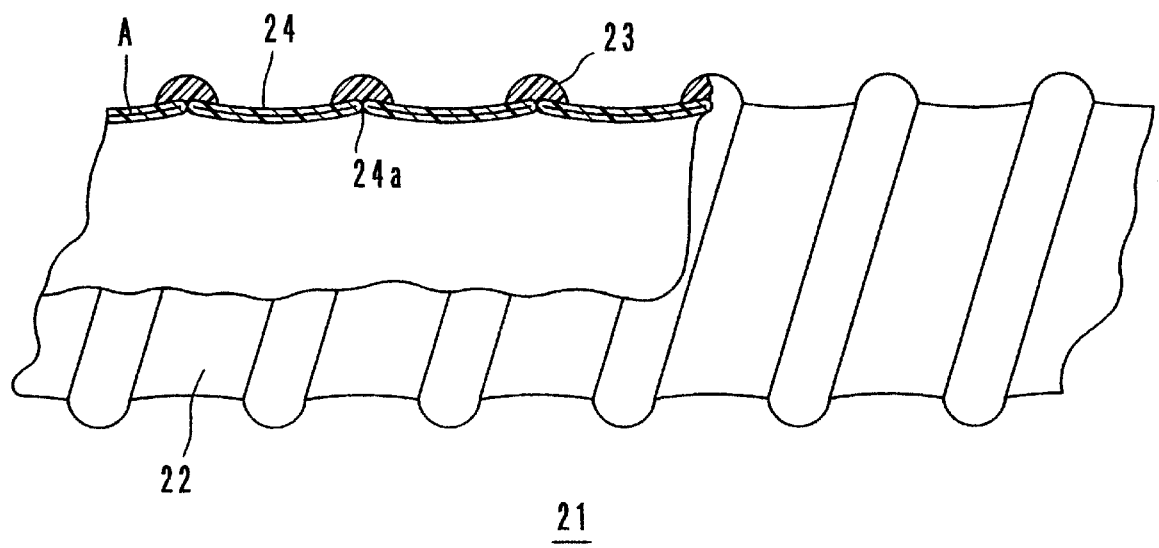
FIG. 5 is a partially cutaway front view of an flexible hose of the second embodiment.

FIG. 5 shows a flexible hose of the second embodiment as partially cut open. The flexible hose 21 comprises a hose body 22 made of soft synthetic resin, and a spiral reinforcement 23 made of hard synthetic resin joined to an outer surface of the hose body 22 by fusion.

The hose body 22 is formed by spirally winding a strip 24 made of soft synthetic resin except PVC, for example, thermoplastic elastomer (TPE) like olefin TPE, styrene TPE, urethane TPE, hydrogen added styrene butadiene rubber (HSBR), etc., or compounds of these materials. The strip 24 is formed by flattening a tube 25 extruded from a cross head 10 (see FIG. 6) of an extruder.

Figure 6:
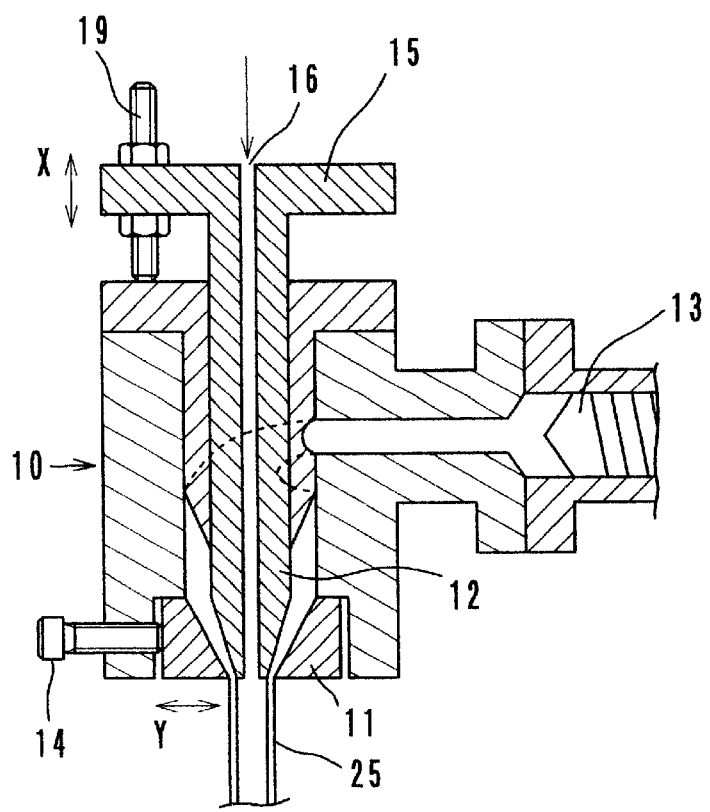
FIG. 6 is a cross section which shows a cross head of an extruder for manufacturing flexible hoses of the second embodiment.

In the cross head 10, as shown in FIG. 6, the melted resin is extruded by a screw 13 through a gap between a die 11 and a nipple 12 which peculiarly correspond to a diametrical shape of the tube 25 to be extruded. A core adjusting bolt 14 averages thickness of the tube 25 in circumference, and a mandrel 15 is connected with the nipple 12 and provided inside with an air passage 16 to blow air into the tube 25.

Figure 7:
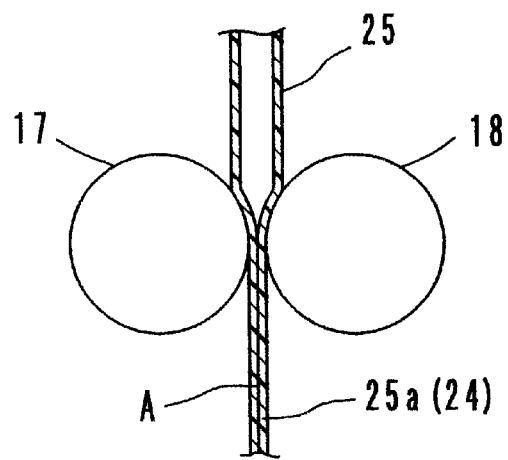
FIG. 7 is an explanatory drawing of flattening a tube in a manufacturing method according to the present invention.

As FIG. 7 shows, right after the extrusion from the cross head 10, the tube 25 passes between a pair of rollers 17 and 18 and is pressed to be formed into a flattened tube 25a. The tube 25a is used as a strip 24, i.e. it is wound spirally around non-illustrated rotating shafts for forming a hose. Meanwhile, a spiral reinforcement 23 in a melted state right after being extruded from another non-illustrated extruder, which is made of hard synthetic resin which is soluble in and thermally fusible with the strip 24, for example, polyolefin resin like polypropylane (PP), polyethilene (PE), etc., is wound and joined by fusion to joint portions 24a between adjacent side edges of the spirally wound strip 24 (see FIG. 5). This fusion joining of the reinforcement 23 with the joint portions 24a of the strip 24 results in joining of the adjacent side edges 24a of the strip 24, which has been already cooled and is not adhesive, together.

Also, in the second embodiment, with respect to the flattened tube 25a used as the strip 24, the inner surface A thereof adheres to itself on mutually opposite faces when the tube 25 is flattened. It is also possible to use an adhesive to adhere the adjacent side edges of the strip 24. The spiral reinforcement 23 may be joined to an inner surface of the strip 24. Also, it is preferable to stretch the strip 24 in a longitudinal direction before winding it spirally so that the hose body 22 can be formed as a wave shape when the strip recovers its natural shape after the winding.

Figure 8:
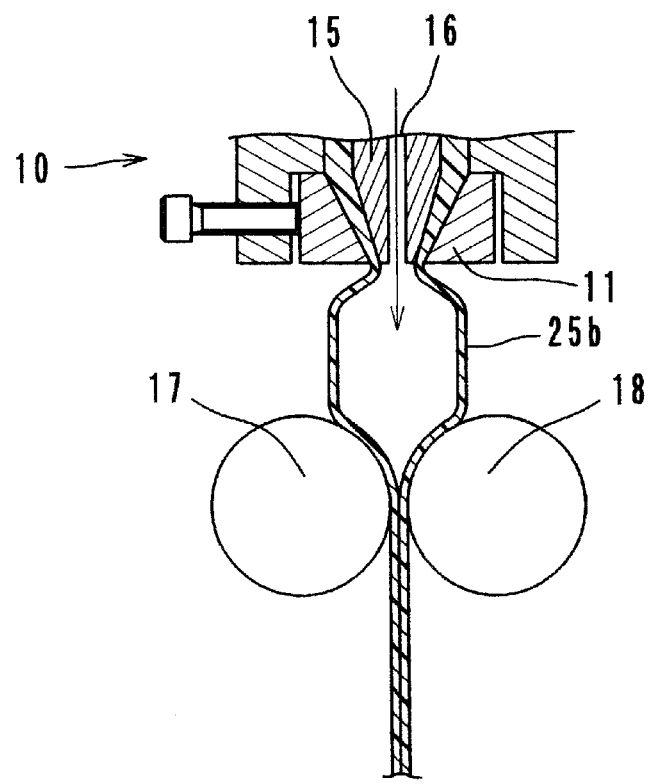
FIG. 8 is an explanatory drawing of flattening a tube after enlarging the tube in diameter in a manufacturing method according to the present invention.
Figures 9A, 9B:
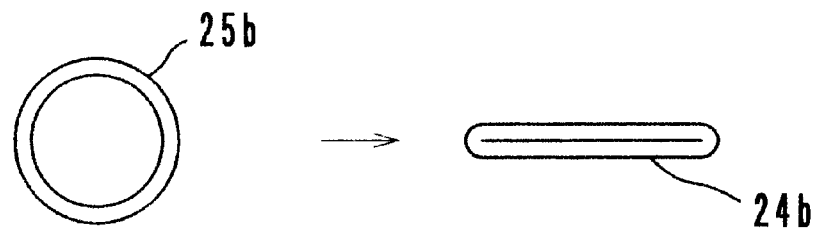
FIGS. 9a and 9b are explanatory drawings of forming a wide strip by flattening an enlarged tube.

FIG. 8 shows a case of widening the strip 24 without changing the die 11 in the cross head 10. A wider strip 24b is formed in such a way that: air is blown through the air passage 16 provided in the mandrel 15 into the tube 25; the tube 25 is extruded from the die 11 being enlarged in diameter by the air; the pressing rollers 17 and 18 sandwich and flatten the tube 25; then, as shown in FIGS. 9a and 9b, a diametrically enlarged tube 25b is formed into the wide strip 24b.

Also, in FIG. 6, a fixing bolt 19 in the mandrel 15 is moved in an arrow X direction to broaden or narrow the gap between the die 11 and the nipple 12, or the die 11 is moved in an arrow Y direction by the core adjusting bolt 14 to adjust biased thickness. Both operations modify thickness of the tube 25 to be extruded, thereby it is possible to thicken or thin the strip freely.

Figures 10A, 10B:
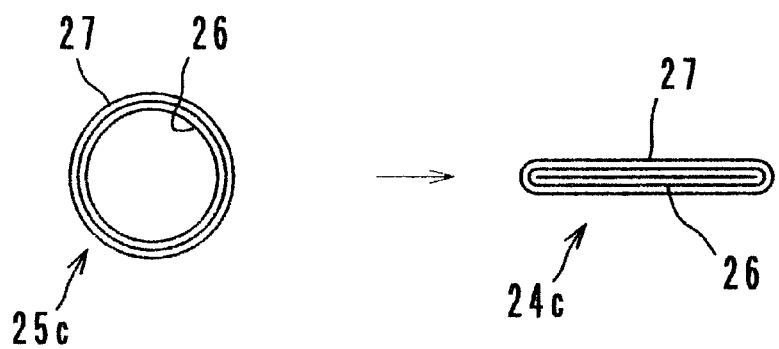
FIGS. 10a and 10b are explanatory drawings of forming a multilayered strip by flattening a multi-layered tube.
Figure 11:
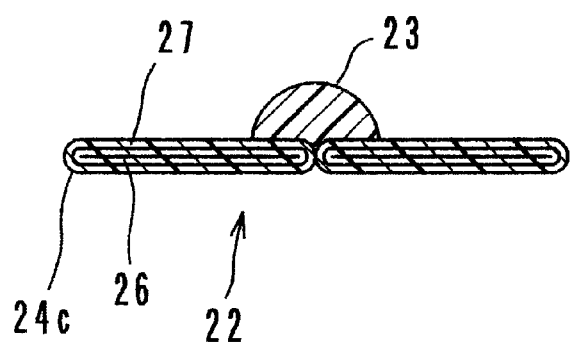
FIG. 11 is a cross section which shows a part of a flexible hose made of a multi-layered strip.

FIGS. 10a and 10b show an example of using a multi-layered strip 24c made by flattening an extruded multi-layered tube 25c which consists of an inner layer 26 and an outer layer 27. In this example, a flexible hose, which is used for a hose body 22 shown in FIG. 11, uses different materials of synthetic resin for the inner and the outer layers, i.e. an expensive material with large strength against friction is used for the outer surface 27 of the hose body 22, and a reasonable general purpose material is used for the inner surface 26. Thus, it is possible to manufacture flexible hoses of high quality at comparative low cost.

Figure 12:
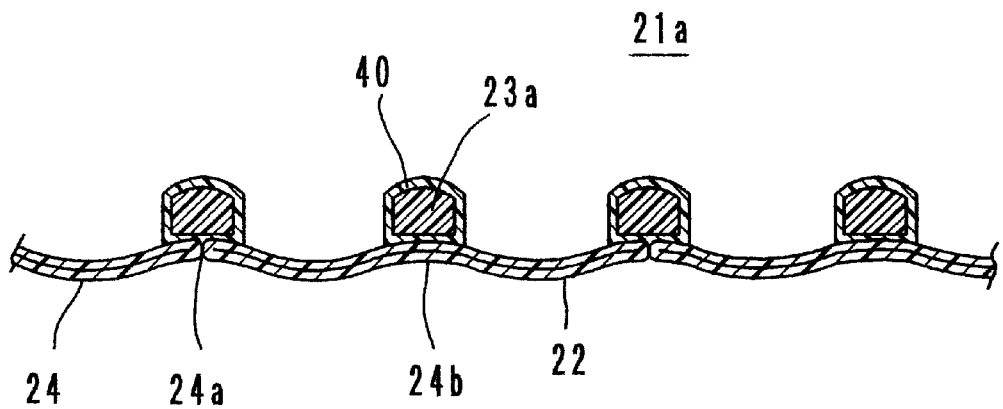
FIG. 12 is a partially sectional view of a flexible hose of the third embodiment.

FIG. 12 shows a flexible hose 21a of the third embodiment. The hose body 22 of the hose 21a, like the hose body 22 shown by FIG. 5, is formed of a strip 24 of a flattened tube 25. A reinforcement 23a made of hard resin is joined to the outer surface of the hose body 22 spirally. The reinforcement 23a has a coating 40 of soft resin, and the reinforcement 23a and the coating 40 are extruded simultaneously. The reinforcement 23a with the coating 40 is joined to the strip 24 at joint portions 24a and middle portions 24b. By using a soft resin material which fuses with the strip 24 hard as the material of the coating 40, the connection between the hose body 22 and the spiral reinforcement 23a becomes stronger, and also, the selection of a material for the reinforcement 23a becomes wider.

It is not always necessary that the coating 40 covers the reinforcement 23a entirely. As FIG. 13 shows, the coating 40 shall be located at least in the portions between the hose body 22 and the reinforcement 23a.

Figure 14:
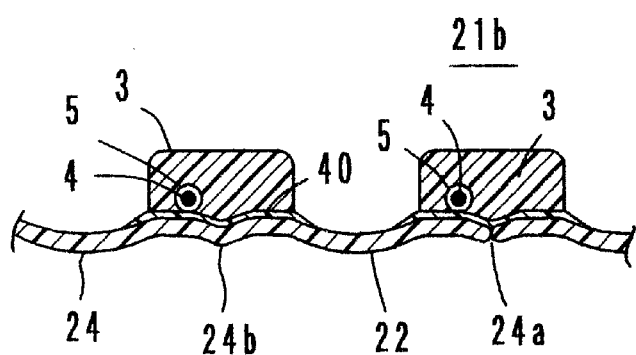
FIG. 14 is a partially sectional view of a flexible hose of the fourth embodiment.

FIG. 14 shows a flexible hose 21b of the fourth embodiment. The hose body 22 of the hose 21b, like the hose body 22 shown by FIG. 5, is formed of a strip 24 of a flattened tube 25. A reinforcement 3 is wound on an outer surface of the hose body 22 spirally and joined to the hose body 22 at joint portions 24a and middle portions 24b via a coating 40. In the spiral reinforcement 3, as FIG. 3 shows, a space 5 is made in the longitudinal direction, and a conductor 4 is inserted in the space 5 to be movable therein. The conductor 4, which may be an uncovered stranded copper wire as described in the first embodiment, is inserted in the space 5 of the spiral reinforcement 3 by use of the head 100 shown by FIG. 4. Also, two reinforcing members may be wound in a double pitch as the reinforcement 3, and conductor which work as an anode and a cathode respectively may be inserted in the respective reinforcing members.

Figure 13:
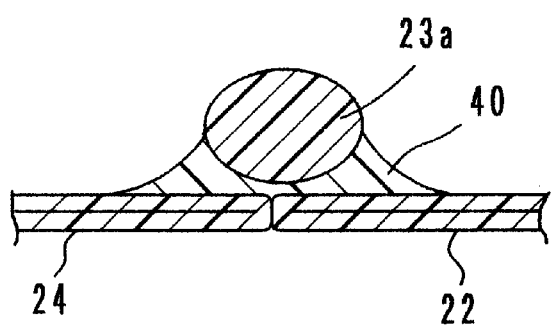
FIG. 13 is a partially sectional view of a modified flexible hose of the third embodiment.

In any of the embodiments shown by FIGS. 12, 13 and 14, the connecting portions between the reinforcement and the hose body are thickened by the coating 40. Therefore, when the hose body is bent, cutting or rupture of the hose body which may be caused by stress concentration can be prevented.

Figure 15:
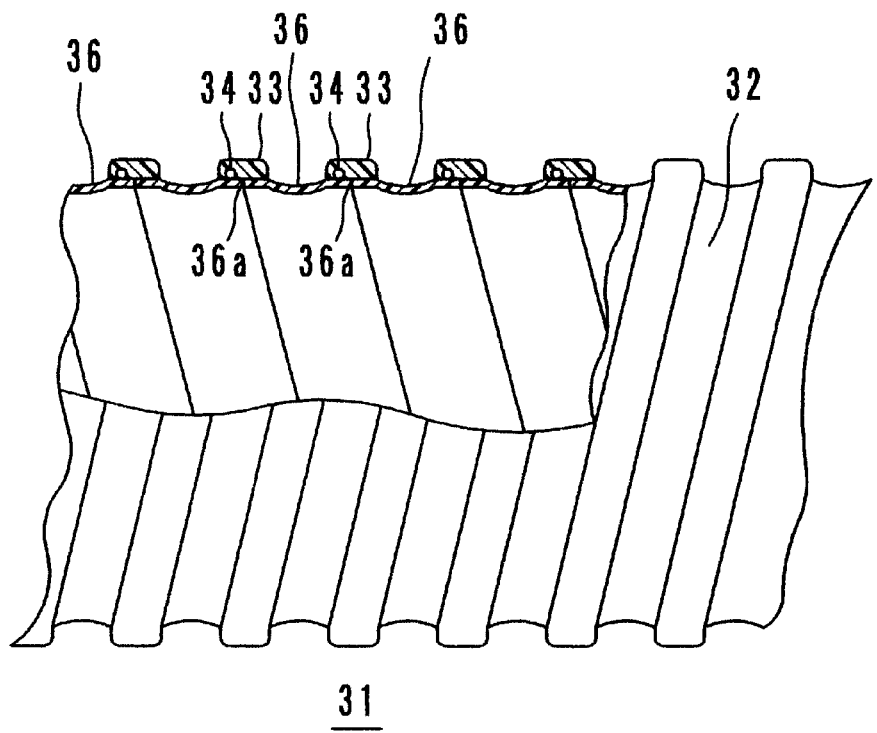
FIG. 15 is a partially cutaway front view of a flexible hose of the fifth embodiment.

FIG. 15 shows a flexible hose 31 of the fifth embodiment as partially cut open. The flexible hose 31 comprises a hose body 32 and a spiral reinforcement 33 joined to an outer surface of the hose body 32.

As the same with the flexible hose 21 in the second embodiment (see FIG. 5), the hose body 32 is formed in such a way that: a tube is flattened to be formed into a strip 36; the strip 36 is wound spirally; and the reinforcement 33 is wound and joined to joint portions 36a of the spirally wound strip 36 by fusion. The materials and the manufacturing methods of the strip 36 and the reinforcement 33 are the same with the strip 24 and the reinforcement 23 described in the second embodiment.

Further, in the flexible hose 31, a space 35 is formed inside the reinforcement 33 in its longitudinal direction, and in the space 35, a conductor 34 is inserted without adhering to the reinforcement 33 so that the conductor 34 can move freely in the space 35. The method of inserting the conductor 34 is the same with the conductor 4 described in the first embodiment.

Figure 16:
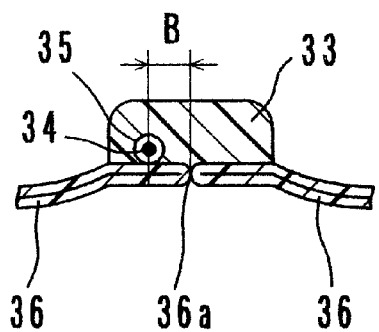
FIG. 16 is a partially enlarged cross section of the flexible hose of the fifth embodiment.

As shown in FIG. 16, the conductor 34 is arranged apart from the joint portion 36a of the strip 36 by a gap of B in an axial direction of the hose body 32. If the conductor 34 is arranged right upon the joint portion 36a, when a strong tension acts on the conductor 34 during the manufacturing process, the conductor 34 may reveal itself through the joint portion 36a to the inside of the hose body 32. On the contrary, if the conductor 34 is arranged apart from the joint portion 36a, even when a tension acts on the conductor 34 to move inward during forming of the hose, the conductor 34 is held on an outer surface of the strip 36. Then, there is no fear that the conductor 34 may reveal itself through the joint portion 36a to the inside of the hose body 32, and detachment of the conductor 34 or electric accidents can be prevented.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A flexible hose comprising:
   a hose body made of soft synthetic resin;
   a reinforcement to help the hose body keep its shape, the reinforcement being made of hard synthetic resin, wound spirally and joined to the hose body by fusion; and
   a non-reinforced conductor arranged inside the reinforcement in its longitudinal direction, the conductor being inserted in a space made in the reinforcement and enclosed only by the reinforcement when the reinforcement is formed by extrusion molding of the hard synthetic resin so as not to adhere to the reinforcement and so as to be movable in a diametrical direction of the hose body.

2. The flexible hose according to claim 1, wherein the hose body is formed by winding a strip spirally and joining adjacent side edges of the strip together, the strip being formed by flattening a tube made of soft resin extruded from an extruder.

3. The flexible hose according to claim 1, wherein the conductor is an uncovered stranded copper wire.

4. The flexible hose according to claim 1, wherein:
   the hose body is made of thermoplastic elastomer except polyvinyl chloride; and
   the reinforcement is made of hard synthetic resin which is compatible with the thermoplastic elastomer.

5. The flexible hose according to claim 1, wherein two reinforcements are wound around the hose body in parallel to each other.

6. The flexible hose according to claim 5, wherein each conductor arranged inside each of the two reinforcements is provided with means for distinguishing polarity.

7. The flexible hose according to claim 6, wherein the means for distinguishing polarity is a difference in color made by plating at least one of the uncovered conductors.

8. The flexible hose according to claim 1, further comprising a conductor which is inserted inside the reinforcement in its longitudinal direction; wherein:
   the reinforcement is wound and joined onto a joint portion of the strip; and
   the conductor in the reinforcement is positioned apart from the joint portion of the strip in an axial direction of the hosebody.

9. A flexible hose comprising:
   a hose body formed by: extruding a tube made of soft resin from a head of an extruder; pressing and flattening the tube to form a strip; and winding the strip spirally with its adjacent side edges joined together; and
   a reinforcement made of hard resin, the reinforcement being wound spirally and joined to the hose body.

10. The flexible hose according to claim 9, wherein the strip is a flattened tube whose inner surface adheres to itself on mutually opposite faces.

11. The flexible hose according to claim 9, wherein the strip is made by flattening a multi-layered tube made of soft resin.

12. The flexible hose according to claim 9, wherein the reinforcement made of hard resin is coated with a coating of soft resin and is connected to the hose body via the coating.

13. The flexible hose according to claim 9, wherein the reinforcement made of hard resin is connected to the hose body via a coating of soft resin.

14. The flexible hose according to claim 9, further comprising a conductor which is inserted inside the reinforcement in its longitudinal direction; wherein:
   the reinforcement is wound and joined onto a joint portion of the strip; and
   the conductor in the reinforcement is positioned apart from the joint portion of the strip in an axial direction of the hose body.

15. A manufacturing method of a flexible hose comprising the steps of:
   pressing and flattening a tube made of soft resin, which is extruded from a head of an extruder, to form a strip; and
   winding the strip spirally with its adjacent side edges joined together to form a hose body.

16. The manufacturing method according to claim 15, further comprising the step of spirally winding a reinforcement made of hard resin and joining the reinforcement to the hose body.

17. The manufacturing method according to claim 16, wherein the reinforcement is wound spirally and joined onto a joint portion of the strip.

* * * * *